United States Patent
Tokonabe et al.

(10) Patent No.: US 6,739,104 B2
(45) Date of Patent: May 25, 2004

(54) VACUUM HEAT-INSULATING BLOCK

(75) Inventors: Hideo Tokonabe, Tokyo (JP); Katsuhiko Umeda, Tokyo (JP)

(73) Assignee: Jamco Corporation, Tokyo (JP)

( * ) Notice: Subject to any disclaimer, the term of this patent is extended or adjusted under 35 U.S.C. 154(b) by 63 days.

(21) Appl. No.: 10/123,241

(22) Filed: Apr. 17, 2002

(65) Prior Publication Data

US 2002/0170265 A1 Nov. 21, 2002

(30) Foreign Application Priority Data

May 18, 2001 (JP) ........................................ 2001-148887

(51) Int. Cl.$^7$ ................................................ E04B 1/74
(52) U.S. Cl. .................. 52/406.2; 52/406.1; 52/783.17; 52/784.14; 52/784.15; 428/72; 428/73; 428/116; 428/117; 428/118; 428/138; 428/304.4; 428/313.4; 428/364
(58) Field of Search .................... 52/406.2, 783.17, 52/784.14, 784.15, 406.1; 428/72, 73, 116, 117, 118, 138, 304.4, 313.4, 364

(56) References Cited

U.S. PATENT DOCUMENTS

| | | | | |
|---|---|---|---|---|
| 3,768,985 A | * | 10/1973 | Woodward | 428/593 |
| 3,802,145 A | * | 4/1974 | Scanlon | 428/116 |
| 3,806,928 A | * | 4/1974 | Costanza | 342/4 |
| 3,927,817 A | * | 12/1975 | Hamilton et al. | 228/157 |
| 4,035,065 A | * | 7/1977 | Fletcher et al. | 359/848 |
| 4,061,812 A | * | 12/1977 | Gilwee et al. | 428/117 |
| 4,094,717 A | * | 6/1978 | Barr | 156/197 |
| 4,117,970 A | * | 10/1978 | Hamilton et al. | 228/173.2 |
| 4,135,019 A | * | 1/1979 | Kourtides et al. | 428/117 |
| 4,193,829 A | * | 3/1980 | Kourtides et al. | 156/276 |
| 4,251,579 A | * | 2/1981 | Lee et al. | 428/73 |
| 4,282,280 A | * | 8/1981 | Cook, Jr. | 428/116 |
| 4,294,055 A | * | 10/1981 | Andresen | 52/784.1 |
| 4,352,484 A | * | 10/1982 | Gertz et al. | 256/13.1 |
| 4,421,811 A | * | 12/1983 | Rose et al. | 428/116 |
| 4,445,956 A | * | 5/1984 | Freeman et al. | 156/154 |
| 4,465,725 A | * | 8/1984 | Riel | 428/116 |
| 4,749,601 A | * | 6/1988 | Hillinger | 428/73 |
| 4,780,159 A | * | 10/1988 | Riel | 156/87 |
| 4,807,411 A | * | 2/1989 | Capaul | 52/144 |
| 4,927,358 A | * | 5/1990 | Tamura et al. | 432/204 |
| 4,973,506 A | * | 11/1990 | Bauer et al. | 428/73 |
| 5,024,369 A | * | 6/1991 | Froes et al. | 228/157 |
| 5,034,256 A | * | 7/1991 | Santiso et al. | 428/73 |
| 5,041,323 A | * | 8/1991 | Rose et al. | 428/116 |
| 5,106,668 A | * | 4/1992 | Turner et al. | 428/116 |
| 5,173,471 A | * | 12/1992 | Usui et al. | 502/439 |
| 5,199,631 A | * | 4/1993 | Anderson et al. | 228/181 |
| 5,237,848 A | * | 8/1993 | Campbell | 72/296 |
| 5,270,092 A | * | 12/1993 | Griffith et al. | 428/69 |
| 5,305,577 A | * | 4/1994 | Richards et al. | 52/783.13 |
| 5,316,171 A | * | 5/1994 | Danner, Jr. et al. | 220/592.21 |
| 5,338,594 A | * | 8/1994 | Wang et al. | 428/117 |

(List continued on next page.)

Primary Examiner—Carl D. Friedman
Assistant Examiner—Christy Green
(74) Attorney, Agent, or Firm—Westerman, Hattori, Daniels & Adrian, LLP

(57) ABSTRACT

The present invention provides a vacuum heat-insulating block including a honeycomb core, wherein the block structure prevents the honeycomb core having a low bulk specific gravity from collapsing by atmospheric pressure, the block attaining flexibility and sound absorption property. The vacuum heat-insulating block 100 according to the present invention is basically composed of a core utilizing a plurality of layered honeycomb members 50 (formed by bonding a honeycomb core member 51 to a support plate 55) and covering the core with a cover member 70. Moreover, a woven or non-woven fabric 60 having air permeability is disposed between the layers of honeycomb core members 51.

5 Claims, 4 Drawing Sheets

U.S. PATENT DOCUMENTS

| | | | |
|---|---|---|---|
| 5,376,598 A | * | 12/1994 | Preedy et al. .................. 501/89 |
| 5,437,750 A | * | 8/1995 | Rinse et al. ................. 156/73.1 |
| 5,445,861 A | * | 8/1995 | Newton et al. ............. 428/116 |
| 5,455,096 A | * | 10/1995 | Toni et al. .................. 428/116 |
| 5,460,864 A | * | 10/1995 | Heitkamp ................... 428/116 |
| 5,667,866 A | * | 9/1997 | Reese, Jr. ................... 428/116 |
| 5,804,278 A | * | 9/1998 | Pike ......................... 428/116 |
| 5,897,739 A | * | 4/1999 | Forster et al. .............. 156/285 |
| 5,994,666 A | * | 11/1999 | Buldhaupt et al. ..... 219/121.64 |
| 6,010,480 A | * | 1/2000 | Abele et al. ........... 604/103.06 |
| 6,045,898 A | * | 4/2000 | Kishi et al. ................. 523/440 |
| 6,054,200 A | * | 4/2000 | Woods ....................... 428/116 |
| 6,085,865 A | * | 7/2000 | Delverdier et al. ......... 181/292 |
| 6,090,729 A | * | 7/2000 | Jonas ......................... 442/180 |
| 6,117,520 A | * | 9/2000 | Wielinga et al. ............ 428/116 |
| 6,203,656 B1 | * | 3/2001 | Syed ........................... 156/292 |
| 6,238,327 B1 | * | 5/2001 | Tambussi ..................... 493/89 |
| 6,247,747 B1 | * | 6/2001 | Kawanomoto et al. ..... 296/191 |
| 6,251,497 B1 | * | 6/2001 | Hoopingarner et al. ..... 428/158 |
| 6,253,530 B1 | * | 7/2001 | Price et al. ................. 52/793.1 |
| 6,337,471 B1 | * | 1/2002 | Kistner et al. .............. 219/633 |
| 6,345,102 B1 | * | 2/2002 | Davis et al. ................... 381/86 |
| 6,387,469 B1 | * | 5/2002 | Ristow et al. .............. 428/116 |
| 6,419,776 B1 | * | 7/2002 | Hoopingarner et al. ..... 156/209 |
| 6,436,505 B2 | * | 8/2002 | Kuroda et al. ................ 428/69 |
| 6,447,627 B1 | * | 9/2002 | Ickinger ..................... 156/197 |
| 6,508,910 B2 | * | 1/2003 | Zhou et al. ................ 156/307.3 |
| 6,511,759 B1 | * | 1/2003 | Schalansky ................ 428/576 |
| 6,544,622 B1 | * | 4/2003 | Nomoto ..................... 428/116 |
| 6,596,124 B2 | * | 7/2003 | Hookham et al. .......... 162/101 |

* cited by examiner

VACUUM HEAT-INSULATING BLOCK

FIELD OF THE INVENTION

The present invention relates to a vacuum heat-insulating block having its interior retained in vacuum condition so as to attain heat insulating and sound blocking features.

DESCRIPTION OF THE RELATED ART

Conventionally, there have been developed various panels and blocks having their respective inner spaces retained in vacuum to attain enhanced heat insulating capability. A vacuum heat-insulating block has its surface covered with flexible substance and its inside depressurized to provide a vacuum pack configuration, and such a configuration leaves the block unsatisfied in strength. To overcome this disadvantage, an improved vacuum block has its surface bonded with a rigid surface material to enhance its heat insulating property and rigidity. An improved heat-insulating panel is designed in a sandwich-like multi-layered configuration with a core element having a surface element superposed at its front and rear surfaces, retaining the inside of the core element in vacuum condition to attain enhanced heat insulating property and strength.

Thus, a foamed material having high compression strength or a core member formed by assembling hexagonal or cylindrical cells, which is called a honeycomb core, is used in the vacuum panel or vacuum block so as to obtain necessary plate thickness and resist exterior pressure. The honeycomb core is characterized in that it has relatively low bulk specific gravity compared to its high compression strength.

In saying that the bulk specific gravity of the core member is low in the vacuum heat-insulating block, it means that the material constituting the inside of the core member transmits little heat and sound, and thus, it has improved heat insulating/sound blocking effects.

However, a problem arises when utilizing the honeycomb core as the core member of the vacuum block, where the side surfaces of the cells in vacuum condition collapses by the atmospheric pressure, thus incapable of maintaining the block configuration.

A panel solving this problem is disclosed in Japanese Patent Laid-Open Provisional Publications No. 10-89589 and No. 11-280199, in which the panel is formed by sandwiching the honeycomb core with surface material having rigidity, and then depressurizing the inside of the core to attain a vacuum condition.

The disclosed panel has flexural strength and rigidity, so when utilizing the panel as a structural member, the panel is preferably used to form a flat surface. However, in order to apply this structural member to a curved surface, the panel must be designed to have a desired curvature at the time of manufacture of the panel member, because it is impossible to bend the panel after completing the manufacturing process.

Therefore, it was difficult to apply the panel formed by covering a vacuum heat-insulating block with a surface member to the inner walls of vehicles or airplanes having curved outer walls.

Conventionally, when applying the vacuum heat-insulating member to a curved surface, a vacuum block having as core material a continuously foamed plastic material having flexibility and manufactured separately from the surface member is used.

Moreover, the vacuum heat-insulating block has advantageous heat insulating and sound blocking properties, but generally has poor sound absorption property. One example of the material having a sound absorption property is glass wool, but the noise absorbing effect of the glass wool is realized by the glass fibers of the glass wool being vibrated by the acoustic vibration of air and rubbed against each other, converting the vibration movement into frictional heat.

However, according to a general vacuum heat-insulating block utilizing the continuously foamed plastic material as core, the above-mentioned friction does not occur, so the block depends solely on inner acoustical loss realized by the dynamic viscosity that the core holds, and thus the noise absorbing property was limited. Even if a honeycomb core is used as the core for the vacuum heat-insulating block and glass wool is filled in the interior space of the core, since the core interior is retained in vacuum condition, the glass fibers will not be rubbed against each other, thus being unable to convert the acoustic vibration to frictional heat.

Acoustic vibration is transmitted by the vibration of the surface plate receiving sound causing the cell walls of the core to vibrate, and further causing the surface plate on the other side to vibrate. Therefore, an improved structural member is proposed having a double core structure and further having a material having viscosity adhered between the two layers, thus enabling to transmit shear force and to realize a noise absorption effect. However, according to this structure, in order for the member to attain shear force, it was impossible to realize a sufficient plate thickness enabling the member with viscosity to absorb the vibration.

SUMMARY OF THE INVENTION

Therefore, the goal of the present invention is to provide a vacuum heat-insulating block including a honeycomb core that has a noise absorption property and retains flexibility enabling the block to be bent easily.

The vacuum heat-insulating block according to the present invention basically comprises a structure including a vacuum core member enwrapped with a cover member, the vacuum core member comprising a plural number of honeycomb members being stacked, each honeycomb member formed by adhering a support plate to a honeycomb core member.

The vacuum heat-insulating block is formed by simply stacking the honeycomb members, so each honeycomb member can move freely without receiving shearing force, and thus the present block attains flexibility.

Moreover, the vacuum core member of the present vacuum heat-insulating block includes a woven or non-woven fabric having air permeability interposed between the stacked honeycomb members.

The vacuum heat-insulating block formed accordingly realizes easy and secure evacuation, thus attaining a block with a high vacuum level.

According to another example, the vacuum core member of the present vacuum heat-insulating block includes a woven or non-woven fabric having a large surface friction coefficient interposed at the superposed surfaces of the stacked honeycomb members.

The vacuum heat-insulating block formed accordingly absorbs acoustic vibration transmitted through the honeycomb members by the woven or non-woven fabric interposed between the honeycomb plates, thus realizing a sound absorbing effect.

Moreover, the vacuum core member of the present vacuum heat-insulating block includes a partition plate interposed between said stacked honeycomb members.

The vacuum heat-insulating block formed as above has improved strength reinforced by the partition plate.

Furthermore, the vacuum core member of the present vacuum heat-insulating block characterizes in that the honeycomb core member of the honeycomb member is formed of a material having dynamic viscosity.

Such vacuum heat-insulating block is capable of absorbing acoustic vibration by the dynamic viscosity of the honeycomb core member.

DETAILED DESCRIPTION OF THE PREFERRED EMBODIMENT

The preferred embodiments of the present invention will now be explained with reference to the examples shown in the accompanied drawings.

Embodiment 1

Figure 1:
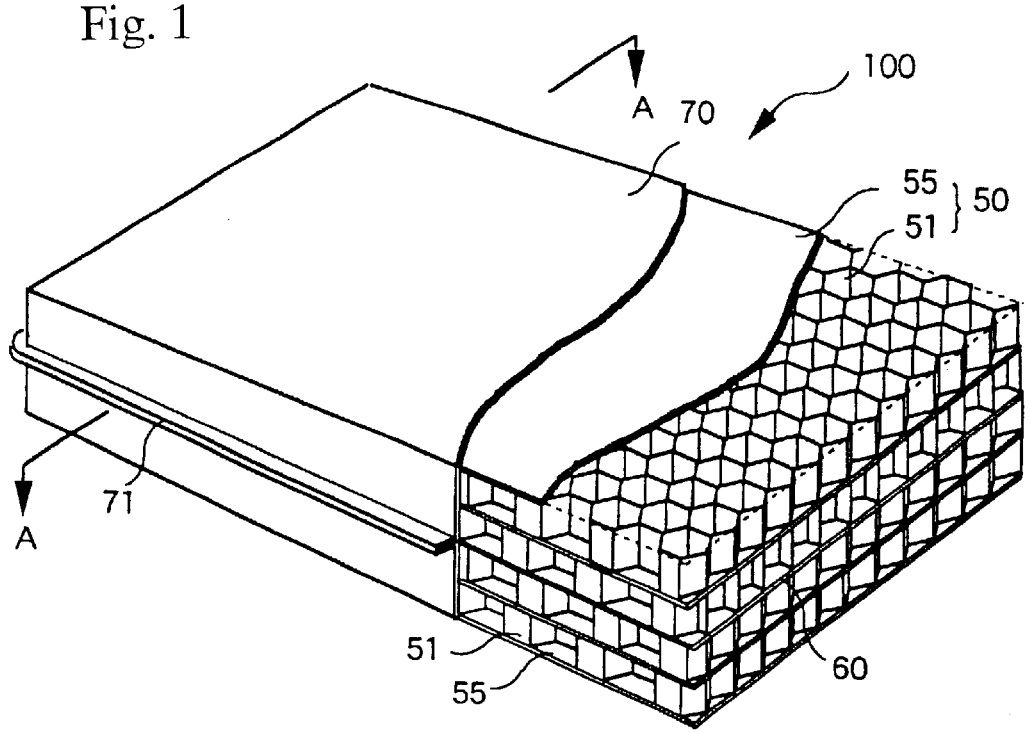
FIG. 1 is an explanatory perspective view of the vacuum heat-insulating block according to the first embodiment of the present invention.
Figure 2:
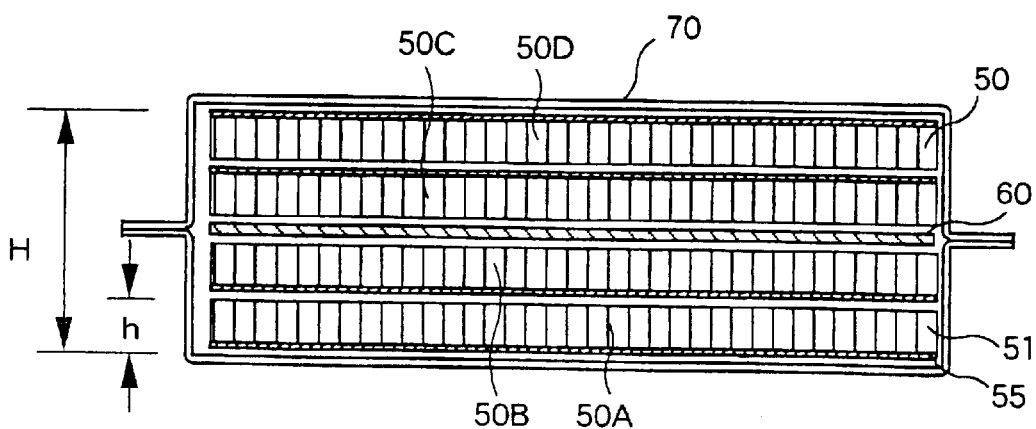
FIG. 2 is a cross-sectional view taken at line A—A of FIG. 1.
Figure 3:
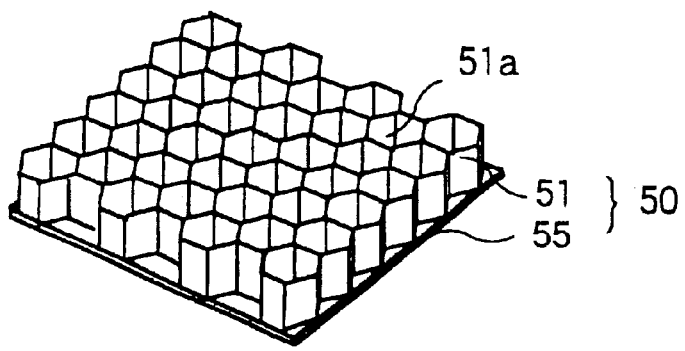
FIG. 3 is an explanatory view showing the structure of the honeycomb plate.

FIG. 1 is an explanatory view showing an embodiment of the vacuum heat-insulating block according to the present invention with a part of the block taken away, FIG. 2 is a cross-sectional view taken along line A—A of FIG. 1, and FIG. 3 is an explanatory view showing the structure of the honeycomb plate.

A vacuum heat-insulating block 100 is formed by layering honeycomb plates 50, and covering the same with a synthetic resin film member 70.

The honeycomb plate 50 is formed by adhering and fixing a support plate 55 to a honeycomb core member 51 which is a collectivity of cells 51$a$ respectively having a hexagonal cross section.

The honeycomb core member 51 consists of an aramid fiber board with high strength. The height h of the cells 51$a$ of the honeycomb core is 1/n of height H of the vacuum heat-insulating block 100. Here, n is the number of layers of the honeycomb plate 50. According to the embodiment shown in the drawing, the vacuum heat-insulating block 100 comprises four layers of honeycomb plates 50, so the height h of the cells 51$a$ is set to approximately ¼ the height H of the vacuum heat-insulating block 100. The honeycomb core member 51 made of aramid fiber board with high strength has a bulk specific gravity of 0.016, and a compression strength of 5 kg/cm$^2$.

The support plate 55 is a thin plate made of metal or a composite material made by solidifying glass fiber with epoxy resin, which is adhered in advance to one side of the honeycomb core member 51. The thickness of the support plate 55 is set so as to prevent the honeycomb core member 51 from collapsing during vacuuming or compression. For example, when a high-strength aluminum alloy plate is used as the support plate 55, the thickness of the support plate should approximately be 1/5000 the height h of the cell 51$a$, that is, 0.02%. Since the specific gravity of the aluminum alloy is 2.8, the specific gravity of the core member is gained by about 0.001, so the specific gravity 0.016 of the aramid core becomes 0.017. However, the specific gravity of the continuous foamed member utilized as the core member in the conventional vacuum heat-insulating panel is approximately 0.01 to 0.15, the panel according to the present embodiment is much lighter in weight. Moreover, the weight can further be cut down by utilizing a thin plate made of a composite material using carbon fiber as the support plate.

Moreover, a metal plate having a large thermal conductance is used as the support plate 55, but since the direction of the heat being transmitted within the support plate 55 is orthogonal to the direction of the heat being transmitted through the block, the insulation efficiency being lost is relatively small. As for sound blocking property, the blocking efficiency is good since the support plate has high flexural rigidity and therefore does not vibrate much.

Further, in the drawing, the vacuum heat-insulating block 100 comprises four layers of honeycomb plates 50, but the number of the layered plates can be any desired number of two or more.

Then, a support plate 55 of a second honeycomb plate 50B is placed on top of a honeycomb core member 51 of a first honeycomb plate 50A. Thereafter, a honeycomb core member 51 of a fourth honeycomb plate 50D is stacked on top of a support plate 55 of a third honeycomb plate 50C.

Then, a partition plate 60 is disposed between the honeycomb core member 51 of the second honeycomb plate 50B and the opposing honeycomb core member 51 of the third honeycomb plate 50C.

The partition plate 60 is a thin plate made of either metal or a composite material made by solidifying glass fiber with epoxy resin. The partition plate 60 is not adhered to but simply held between the second honeycomb plate 50B and the third honeycomb plate 50C.

Thus, the member formed by laminating honeycomb plates 50 is covered with a cover member 70, and then the inside is evacuated.

The cover member 70 is a non-permeable film made of synthetic resin, the surrounding rim portion of which is sealed to form a seal portion 71, to an appropriate area of which is mounted a suction port (not shown) connected to a suction means to evacuate the inside of the cover member 70.

Lastly, the intake port portion is sealed so as to form a vacuum heat-insulating block 100.

Figure 4:
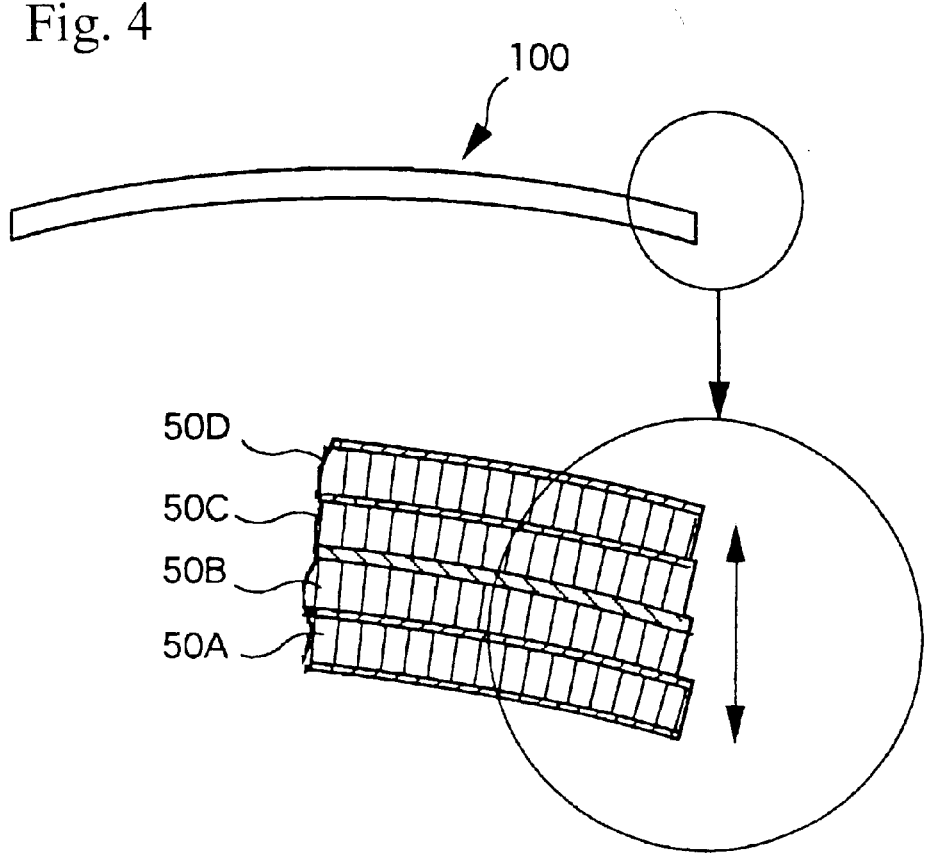
FIG. 4 is an explanatory view showing the bent state of the vacuum heat-insulating block according to the present invention.

FIG. 4 is referred to in explaining the bent state of the vacuum heat-insulating block 100 formed as explained above.

Since the first honeycomb plate 50A, the second honeycomb plate 50B, the third honeycomb plate 50C, and the fourth honeycomb plate 50D of the vacuum heat-insulating block 100 are simply overlaid one over the other, so each honeycomb plate 50 can be stretched freely toward the direction of bend.

Figure 5:
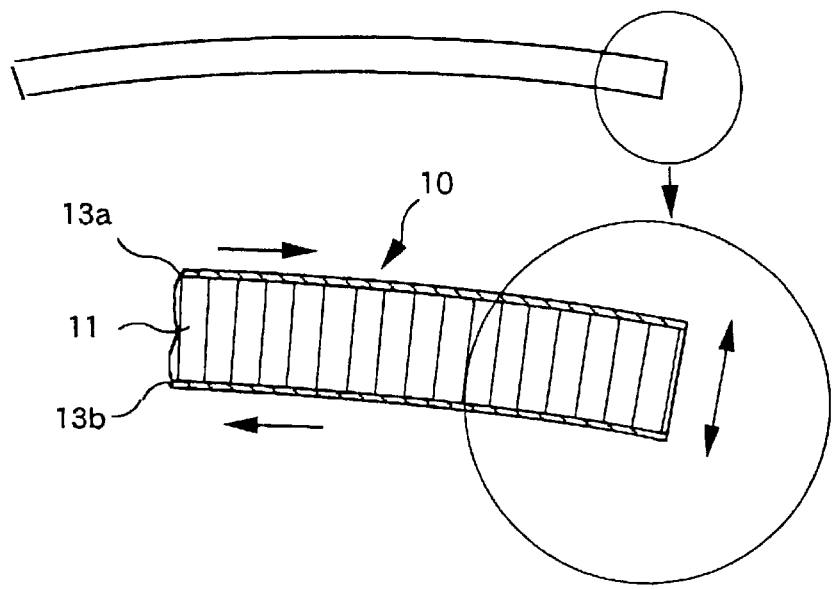
FIG. 5 is an explanatory view showing the bent state of the vacuum heat-insulating block according to the prior art.

In contrast, FIG. 5 is referred to in explaining the bent state of the conventional vacuum insulation panel 10 (disclosed in Japanese Laid-Open Provisional Publications No. 10-89589 and No. 11-280199) where the prior art honeycomb core member is sandwiched between surface members.

Tension occurs to the outer surface member 13a of the vacuum heat-insulating panel 10 and compressive force occurs to the inner surface member 13b, generating reaction force against bend, and the end surface of the panel is slanted.

As explained, by utilizing plural honeycomb plates 50 that are simply stacked as the core member, and by designing the honeycomb plates so as not to receive any shearing force, the vacuum heat-insulating block can be bent easily without causing any tension or compressive force to the inner and outer surfaces thereof.

Thus, the vacuum heat-insulating block 100 attains sufficient flexibility.

Moreover, a honeycomb core member having a low height can be created by cutting a honeycomb core having a standard height to the desired height. When cutting the core member, the set of the saw blade used for cutting can be enlarged to form an irregular cut surface, thereby further improving the permeability of the honeycomb core member and to facilitate evacuation. As for the evacuation process, the evacuation can be facilitated by interposing fibrous cloth between the layered surfaces of the honeycomb plates, or by providing holes to the support plate. This also reduces the weight of the vacuum heat-insulating block.

Embodiment 2

Figure 6:
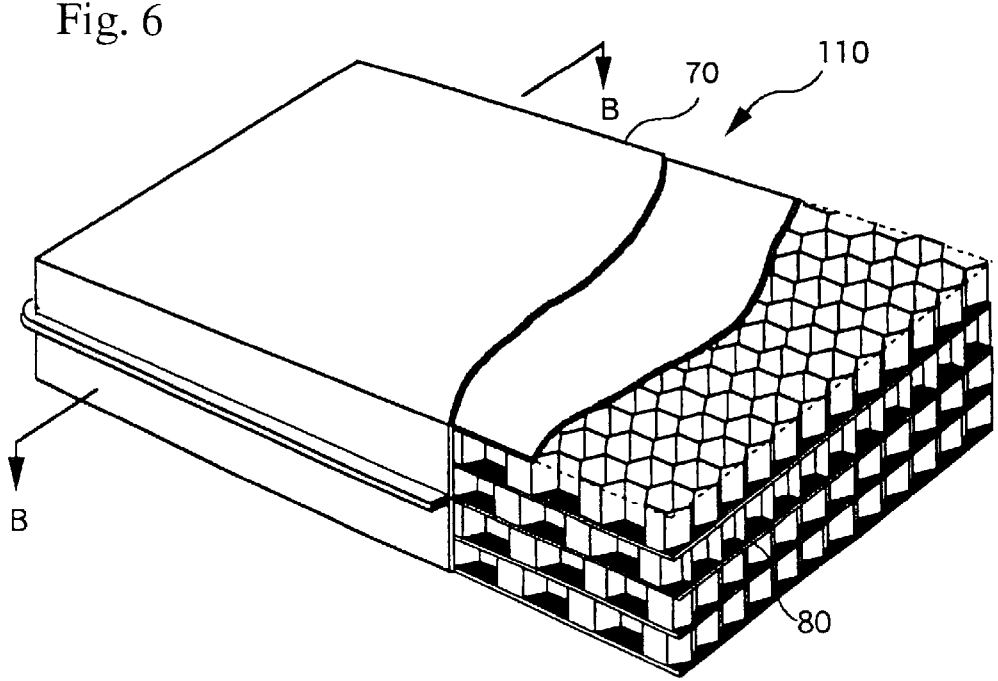
FIG. 6 is an explanatory perspective view of the vacuum heat-insulating block according to embodiment 2 of the present invention.
Figure 7:
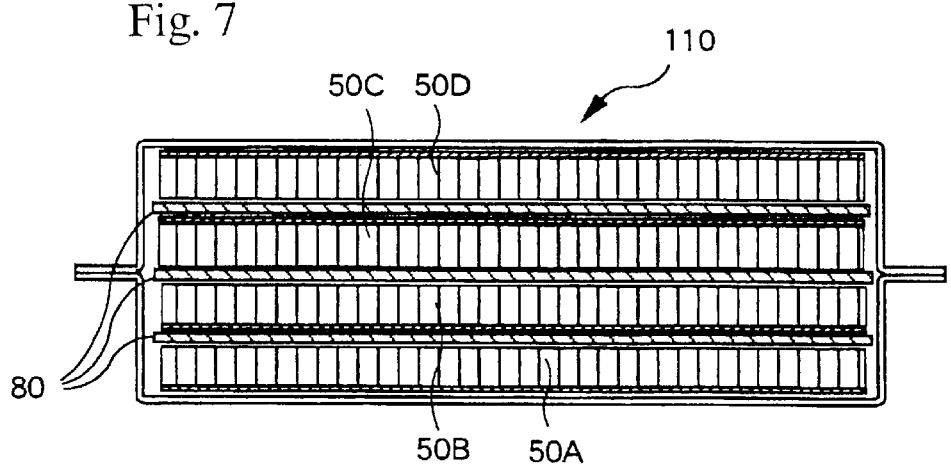
FIG. 7 is a cross-sectional view taken at line B—B of FIG. 6.

With reference to FIGS. 6 and 7, the present embodiment shows a vacuum heat-insulating block having a sound absorption property.

The components of the present embodiment that are similar to those of embodiment 1 are provided with the same reference numbers, and the detailed description thereof are omitted. The same applies to the following embodiments.

A vacuum heat-insulating block 110 comprises, for example, four layers of honeycomb plates 50 formed by adhering a honeycomb core member 51 to a support plate 55. Further, a sound absorption member 80 is disposed between each layer. In other words, the sound absorption member 80 is disposed between the honeycomb core member 51 of the first honeycomb member 50A and the support plate 55 of the second honeycomb member 50B, between the second honeycomb member 50B and the honeycomb core member 51 of the third honeycomb member 50C, and between the support plate 55 of the third honeycomb member 50C and the honeycomb core member 51 of the fourth honeycomb member 50D.

The sound absorption member 80 is formed of a woven or non-woven fabric made of a synthetic fiber having a large surface friction coefficient. Examples of the synthetic fiber having a large surface friction coefficient include an activated carbon fiber and a polyacrylonitrile fiber having only the surface carbonized. Another example is a glass fiber having a fluoridized surface. The amount of the sound absorption member 80 depends on the sound absorbing effect of the material being used.

Since the vacuum heat-insulating block 110 formed as disclosed above has the inside of the cover member 70 maintained in vacuum condition, the block attains a heat insulating and sound blocking property. Further, by disposing sound absorption members 80 between the multi-layered core, the block further attains a sound absorbing function since the sound absorption member converts the acoustic vibration energy into frictional heat energy.

If an acoustic vibration is received by one surface of the vacuum heat-insulating block 110 utilizing as its core a honeycomb member 50 comprising a multi-layer form of honeycomb core members 51 adhered to support plates 55, the acoustic vibration is not transmitted through the block since the cells of the honeycomb core member 51 is vacuumed. However, since the cell wall surface of the honeycomb core member 51 is formed of a thin plate, the acoustic vibration is transmitted as a push-pull force to the adjacent support plate 55 or honeycomb core member 51 of the layered honeycomb member 50, by which the sound is repeated. The fibers comprised in the fiber layer or the sound absorbing layer 80 disposed between the layers are rubbed against one another by the vibration of the honeycomb core or the support plate coming into contact therewith, generating a frictional heat energy corresponding to the surface friction coefficient, thereby absorbing the vibration energy.

Moreover, since the absorption member 80 is made of either woven or non-woven fabric, it has air permeability, and it successfully functions to simplify and speed-up the evacuation process.

Embodiment 3

Figure 8:
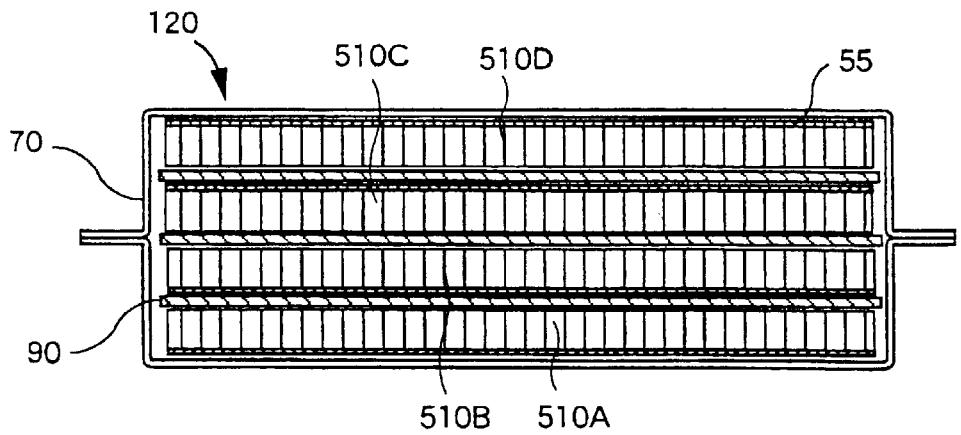
FIG. 8 is a cross-sectional view of the vacuum heat-insulating block according to embodiment 3 of the present invention.

With reference to FIG. 8, the present embodiment relates to selecting the material for forming the honeycomb core so as to provide a sound absorbing effect thereto.

A vacuum heat-insulating block 120 comprises layers of honeycomb members 50 formed by adhering a honeycomb core member 510 to a support plate 55, and a cover member 70 having its interior maintained in vacuum condition.

The honeycomb core member 510 is made with a material having dynamic viscosity. The acoustic vibration received by the support plate 55 disposed on the surface of the vacuum heat-insulating block 120 vibrates the honeycomb core member 510. The vibration is converted into thermal energy by the dynamic viscosity that the material holds.

Vinyl chloride and nylon are examples of a material having dynamic viscosity and which can withstand the compressive force of the atmospheric pressure. This material having dynamic viscosity is made into a film structure and formed into a honeycomb shape where plural hexagonal or cylindrical cells are connected together. Thereafter, the formed structure is cut to an appropriate height and adhered to a support plate to form the honeycomb member.

Generally, a material having dynamic viscosity does not have air permeability, so in order to facilitate the evacuation process in a reliable manner, a fabric 90 having permeability is disposed between the honeycomb members 510A, 510B, 510C and 510D. Of course, this fabric can be the material disclosed in embodiment 2 having a sound absorbing function.

Embodiment 4

Figure 9:
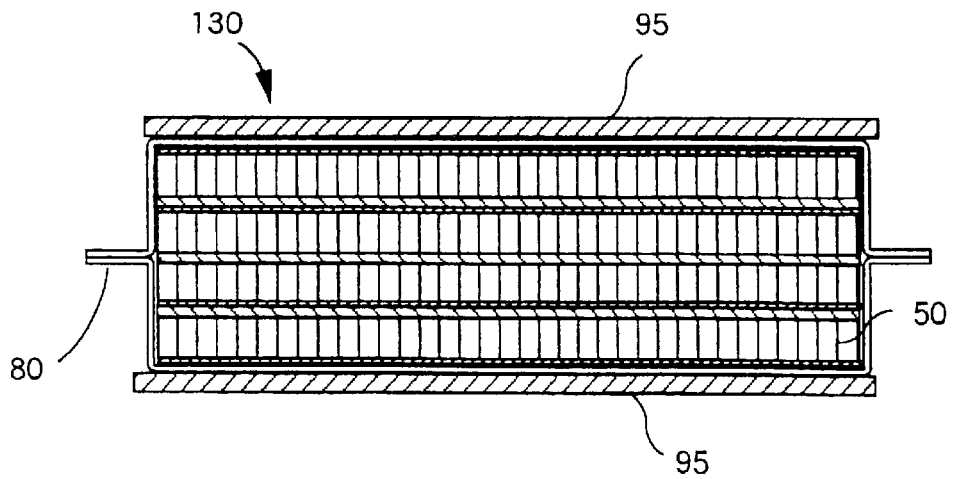
FIG. 9 is a cross-sectional view of the vacuum heat-insulating block according to embodiment 4 of the present invention.

As shown in FIG. 9, this embodiment disposes a protection member on the outer surface of the vacuum heat-insulating block.

The vacuum heat-insulating block 130 comprises layers of honeycomb members 50 formed by adhering honeycomb core members 51 to support plates 55, similar to the foregoing embodiments. Further, the inside of the cover member 70 is evacuated.

Thereafter, protection members 95 are disposed on the outer surfaces of the cover member 70.

The protection member 95 is made of a metal plate or a fiber layer and the like, protecting the cover member 70 from external force.

If the cover member 70 of the vacuum heat-insulating block 130 having its inside evacuated is damaged by external force, the vacuum condition is deteriorated and the heat-insulating and sound blocking effects of the block is lost. Therefore, protection members 95 are disposed so as to maintain the vacuum condition of the vacuum heat-insulating block 130 for a longer period of time.

The vacuum heat-insulating block comprising a multilayered honeycomb member according to the present invention has flexibility and can prevent shearing force from being transmitted from one surface to another. Thus, the present vacuum heat-insulating block can advantageously be applied to structural members used for airplanes and vehicles having a body surrounded with curved outer walls.

Moreover, by utilizing a honeycomb core reinforced with support plates, the present invention enables to provide a simple vacuum heat-insulating block which is lightweight and can resist against external pressure.

Furthermore, the present invention provides a vacuum heat-insulating block having a sound absorption property in addition to its heat-insulating and sound blocking properties.

What is claimed is:

1. A vacuum heat-insulating block comprising;

a vacuum core member; and a cover member enwrapping said vacuum core member;

said vacuum core member comprising a plurality of honeycomb members being stacked, said vacuum core member includes a partition plate interposed between said stacked honeycomb members, each honeycomb member formed by adhering a support plate to one surface of a honeycomb core member, wherein each honeycomb member is capable of moving freely without receiving shearing force.

2. A vacuum heat-insulating block according to claim 1, wherein said vacuum core member includes a woven or non-woven fabric having air permeability interposed between said stacked honeycomb members.

3. A vacuum heat-insulating block according to claims 1 or 2, wherein said vacuum core member includes a woven or non-woven fabric having a large surface friction coefficient interposed between the superposed surfaces of said honeycomb members.

4. A vacuum heat-insulating block according to claims 1 or 2, wherein the honeycomb core member of the honeycomb member contained in the vacuum core member is formed of a material having dynamic viscosity.

5. A vacuum heat-insulating block according to claim 1 or 2, wherein a protection member is disposed on the outer surface of the cover member enwrapping said vacuum heat-insulating block.

* * * * *